(12) United States Patent
Harada et al.

(10) Patent No.: US 11,310,771 B2
(45) Date of Patent: Apr. 19, 2022

(54) USER TERMINAL AND RADIO COMMUNICATION METHOD

(71) Applicant: NTT DOCOMO, INC., Tokyo (JP)

(72) Inventors: Hiroki Harada, Tokyo (JP); Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/968,921

(22) PCT Filed: Feb. 15, 2018

(86) PCT No.: PCT/JP2018/005334
§ 371 (c)(1),
(2) Date: Aug. 11, 2020

(87) PCT Pub. No.: WO2019/159291
PCT Pub. Date: Aug. 22, 2019

(65) Prior Publication Data
US 2020/0374837 A1  Nov. 26, 2020

(51) Int. Cl.
*H04W 72/04* (2009.01)
*H04W 72/00* (2009.01)
*H04W 56/00* (2009.01)

(52) U.S. Cl.
CPC ....... *H04W 72/005* (2013.01); *H04W 56/001* (2013.01); *H04W 72/042* (2013.01)

(58) Field of Classification Search
CPC ... H04W 72/005; H04W 72/02; H04W 72/04; H04W 72/042; H04W 72/12; H04W 72/1205; H04W 72/1278; H04W 72/1284; H04W 56/001; H04B 7/0695; H04L 27/261; H04L 5/005; H04L 5/0094
See application file for complete search history.

(56) References Cited

U.S. PATENT DOCUMENTS

| | | | |
|---|---|---|---|
| 10,892,870 B2 * | 1/2021 | Liu | H04L 5/0007 |
| 2019/0081721 A1 * | 3/2019 | Ly | H04J 11/0069 |

(Continued)

OTHER PUBLICATIONS

International Search Report issued in Application No. PCT/JP2018/005334, dated May 15, 2018 (5 pages).

(Continued)

*Primary Examiner* — Siu M Lee
(74) *Attorney, Agent, or Firm* — Osha Bergman Watanabe & Burton LLP

(57) ABSTRACT

In order to properly notify of resources in which a synchronization signal block is transmitted in the future radio communication system, a user terminal has a receiving section that receives pattern information indicating whether or not a synchronization signal block is transmitted in each of a plurality of transmission candidate positions within a group of transmission candidate positions of the synchronization signal block, and group information indicating a method of applying the pattern information to each of a plurality of groups, and a control section that controls, based on the group information, one of assuming that the synchronization signal block is transmitted in all transmission candidate positions within a particular group, and of determining the plurality of transmission candidate positions within the particular group according to the pattern information.

6 Claims, 15 Drawing Sheets

(56) References Cited

U.S. PATENT DOCUMENTS

| | | | |
|---|---|---|---|
| 2019/0150110 A1* | 5/2019 | Ko | H04J 11/00 |
| | | | 370/350 |
| 2020/0177345 A1* | 6/2020 | Yuan | H04W 56/0015 |
| 2020/0229113 A1* | 7/2020 | Yoon | H04J 11/0086 |
| 2020/0305102 A1* | 9/2020 | Jia | H04W 72/0453 |

OTHER PUBLICATIONS

Written Opinion issued in International Application No. PCT/JP2018/005334, dated May 15, 2018 (3 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #91; R1-1720789; "Remaining details on Synchronization signal;" NTT DOCOMO, INC.; Nov. 27-Dec. 1, 2017; Reno, USA (6 pages).
3GPP TSG RAN WG1 Meeting #91; R1-1719892; "Remaining Details on Synchronization signal;" LG Electronics; Nov. 27-Dec. 1, 2017; Reno, USA (11 pages).
3GPP TSG RAN WG1 Meeting 90bis; R1-1718463 "On remaining details of SS/PBCH block" ITL; Prague, CZ; Oct. 9-13, 2017 (6 pages).
Extended European Search Report issued in European Application No. 18906080.9, dated Aug. 30, 2021 (7 pages).

\* cited by examiner

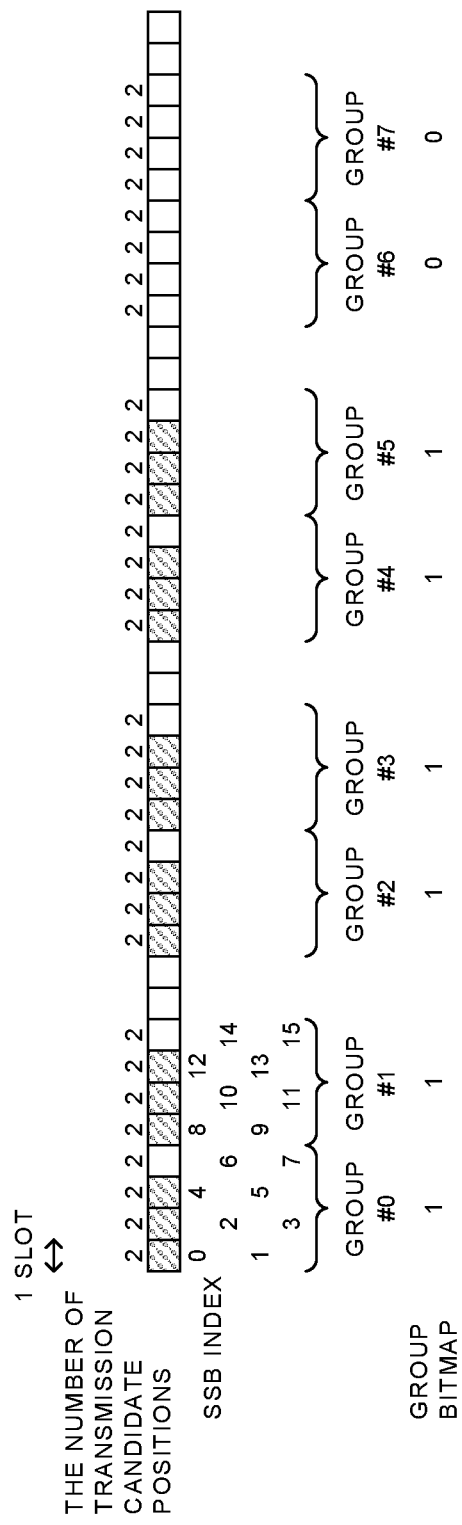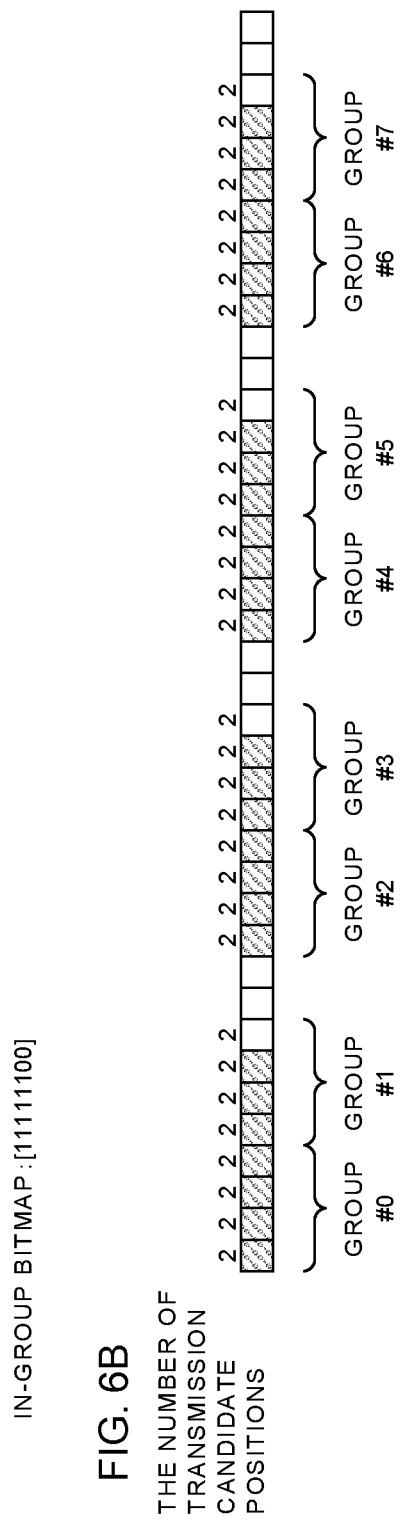

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of higher capacity, more sophistication and the like than LTE (LTE Rel. 8, 9), LTE-A (LTE-Advanced, LTE Rel. 10, 11, 12, 13) has been specified.

Successor systems (e.g., also referred to as FRA (Future Radio Access), 5G (5th generation mobile communication system), 5G+(plus), NR (New Radio), NX (New radio access), FX (Future generation radio access), LTE Rel. 14 or 15 onward, etc.) to LTE have also been studied.

In the existing LTE system (e.g., LTE Rel. 8-13), a user terminal (UE: User Equipment) detects synchronization signals (PSS (Primary Synchronization Signal) and/or SSS (Secondary Synchronization Signal)) by initial access procedure (also called, cell search, etc.), thereby acquires synchronization with the network (e.g., radio base station (eNB) (eNodeB)), and identifies the cell to connect (for example, identifies with a cell ID (Identifier)).

Further, after the cell search, the UE receives Master Information Block (MIB) transmitted on a broadcast channel (PBCH: Physical Broadcast Channel), System Information Block (SIB) transmitted on a downlink (DL) shared channel (PDSCH: Physical Downlink Shared Channel) and the like, and acquires configuration information (which may be called broadcast information, system information, etc.) for communication with the network.

BACKGROUND ART

Citation List

[Non-patent literature 1] 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In future radio communication systems (e.g., 5G or NR), it is studied to define a resource unit including synchronization signals and broadcast channel as a synchronization signal block to perform initial access based on the SS block. The synchronization signal is also called PSS and/or SSS, NR-PSS and/or NR-SSS, or the like. The broadcast channel is also called PBCH, NR-PBCH or the like. The synchronization signal block is also called an SS block (Synchronization Signal block: SSB), SS/PBCH block or the like.

The user terminal needs to recognize resources in which the SS block is transmitted. However, by limiting an information amount for notifying of resources in which the SS block is transmitted, there is the risk that the user terminal is not capable of correctly recognizing the resource.

The present invention was made in view of such a respect, and it is an object of the invention to provide a user terminal and radio communication method of properly notifying of resources in which the synchronization signal block is transmitted in future radio communication system.

Solution to Problem

A user terminal according to one aspect of the present invention is characterized by having a receiving section that receives pattern information indicating whether or not a synchronization signal block is transmitted in each of a plurality of transmission candidate positions within a group of transmission candidate positions of the synchronization signal block, and group information indicating a method of applying the pattern information to each of a plurality of groups, and a control section that controls, based on the group information, one of assuming that the synchronization signal block is transmitted in all transmission candidate positions within a particular group, and of determining the plurality of transmission candidate positions within the particular group according to the pattern information.

Advantageous Effect of the Invention

According to the present invention, in future radio communication systems, it is possible to properly notify of resources in which the synchronization signal block is transmitted.

BRIEF DESCRIPTION OF DRAWINGS

FIGS. 6A and 6B are diagrams showing one example of allocation of actually transmitted SSBs for enabling signaling thereof with RMSI, and one example of allocation of actually transmitted SSBs for disabling signaling thereof with RMSI;

DESCRIPTION OF EMBODIMENTS

In future radio communication systems (e.g., LTE Rel. 14 onward, 5G, NR or the like), it is studied to define a signal block (also referred to as an SS/PBCH block, SS/PBCH block, etc.) including synchronization signals (also referred to as SS, PSS and/or SSS, NR-PSS and/or NR-SSS, or the like) and broadcast channel (also referred to as a broadcast signal, PBCH, NR-PBCH or the like). A set of one or more signal blocks is also called a signal burst (SS/PBCH burst or SS burst). A plurality of signal blocks within the signal burst is transmitted at different times on different beams (also referred to as beam sweep, etc.).

The SS/PBCH block is comprised of one or more symbols (e.g., OFDM symbols). Specifically, the SS/PBCH block may be comprised of a plurality of consecutive symbols. Within the SS/PBCH block, each of PSS, SSS and NR-PBCH may be allocated to one or more different symbols. For example, it is also studied to configure the SS/PBCH block using 4 or 5 symbols including PSS of 1 symbol, SSS of 1 symbol and PBCH of 2 or 3 symbols.

A set of one or a plurality of SS/PBCH blocks may be called an SS/PBCH burst. The SS/PBCH burst may be comprised of SS/PBCH blocks where frequency and/or time resources are contiguous, or may be comprised of SS/PBCH blocks where frequency and/or time resources are discontiguous. The SS/PBCH burst may be configured with given periodicity (may be called SS/PBCH burst periodicity), or may be configured without periodicity.

Further, one or a plurality of SS/PBCH bursts may be called an SS/PBCH burst set (SS/PBCH burst series). The SS/PBCH burst set may be configured periodically. A user terminal may assume that the SS/PBCH burst set is transmitted periodically (with SS/PBCH burst set periodicity) to control reception processing.

Figure 1A:
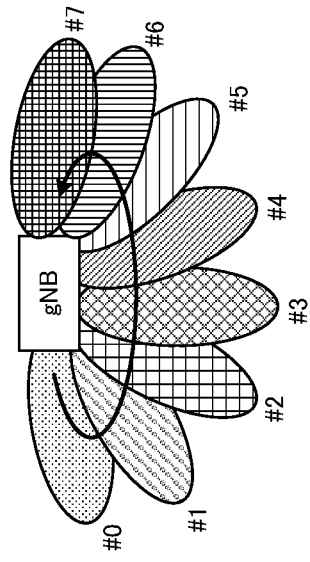
FIGS. 1A and 1B are diagrams showing one example of an SS burst set.
Figure 1B:
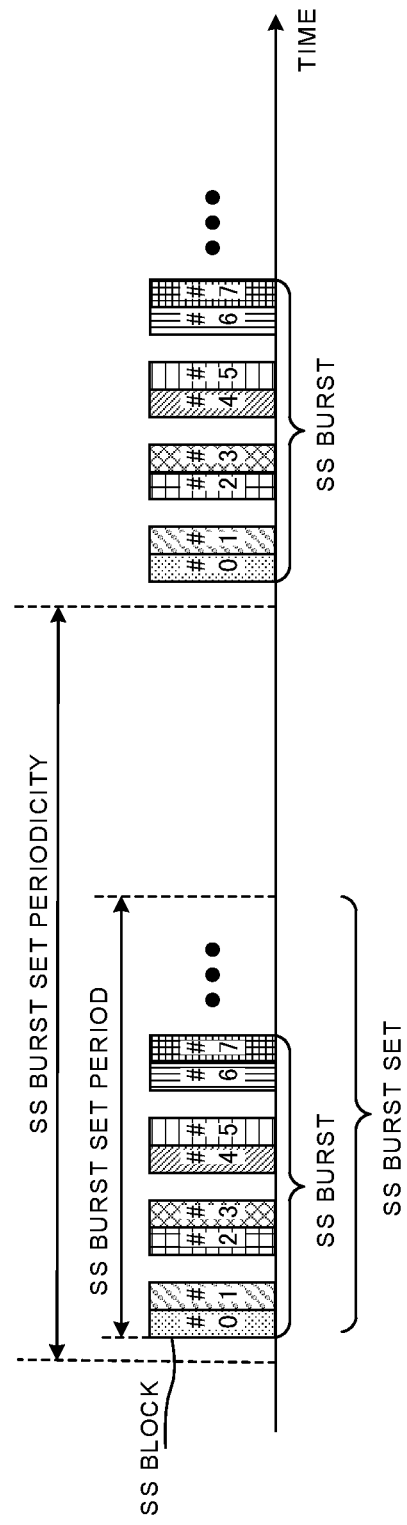

FIG. 1 is a diagram showing one example of the SS burst set. FIG. 1A shows one example of beam sweeping. As shown in FIGS. 1A and 1B, a radio base station (e.g., gNB) may vary the directivity of a beam temporally (beam sweeping) to transmit different SS blocks using different beams. In addition, FIGS. 1A and 1B show the example using multibeam, and it is also possible to transmit the SS block using a single beam.

As shown in FIG. 1B, the SS burst is comprised of one or more SS blocks, and the SS burst set is comprised of one or more SS bursts. For example, in FIG. 1B, it is assumed that the SS burst is comprised of 8 SS blocks, #0 to #7, but is not limited thereto. The SS blocks #0 to #7 may be transmitted on different beams #0 to #7, respectively (FIG. 1A).

As shown in FIG. 1B, the SS burst set including SS blocks #0 to #7 may be transmitted not to exceed a given period (e.g., 5 ms or less, also referred to as an SS burst set period, etc.). Further, the SS burst set may be repeated with given periodicity (e.g., 5 ms, 10 ms, 20 ms, 40 ms, 80 ms or 160 ms, also referred to as the SS burst set periodicity, etc.).

In addition, in FIG. 1B, a given time interval exists between SS blocks #1 and #2, between SS blocks #3 and #4 and between SS blocks #5 and #6, but the time interval may not exist, and the interval may be provided between other SS blocks (e.g., between SS blocks #2 and #3, between SS blocks #5 and #6 and the like). At the time interval, for example, a DL control channel (also referred to as PDCCH, NR-PDCCH, Downlink Control Information (DCI) or the like) may be transmitted, and/or a user terminal may transmit a UL control channel (PUCCH: Physical Uplink Control Channel). For example, in the case where each SS block is comprised of 4 symbols, a slot of 14 symbols may include the PDCCH of 2 symbols, 2 SS blocks, PUCCH corresponding to 2 symbols and guard time.

Further, an index (SS block index) of the SS block is notified, using the PBCH and/or DMRS (DeModulation Reference Signal) (PBCH DMRS) for the PBCH included in the SS block. Based on the PBCH (or PBCH DMRS), the UE is capable of grasping the SS block index of the received SS block.

Among MSI (Minimum System Information) read by the UE at the time of initial access, the MIB (Master Information Block) is carried on the PBCH. The residue of the MSI is RMSI (Remaining Minimum System Information), and corresponds to SIB (System Information Block) 1 and SIB 2 in LTE. Further, with the PDCCH indicated by the MIB, the RMSI is scheduled.

In NR, the SS block (SSB) may be used in synchronization, cell detection, timing detection of a frame and/or a slot and the like. A plurality of SSBs within an SSB transmission period of 5 ms indicates the same cell ID. Each SSB indicates a specific SSB index. The SSB index is to determine a time position (transmission candidate position) of the SSB within the SSB transmission period.

The maximum number L of SSBs capable of being transmitted within single SSB transmission periodicity may be determined corresponding to a frequency band. For example, L in a frequency band of 0 to 3 GHz may be "4", L in a frequency band of 3 to 6 GHz may be "8", and L in a frequency band of 6 to 52.6 GHz may be "64". The SSB transmission periodicity may be set at one of 5 ms, 10 ms, 20 ms, 40 ms, 80 ms and 160 ms.

In addition, frequency bands lower than 6 GHz may be called sub-6, FR (Frequency Range) 1. Frequency bands higher than 6 GHz may be called above-6, FR2, millimeter wave and the like, or may refer to frequency bands higher than 24 GHz.

One SSB transmission period is included in the SSB transmission periodicity. Transmission candidate positions (timing, time resources) of the SSB within the SSB transmission period (e.g., 5 ms) may be defined by specifications. The SSB transmission period may be a first or latter half frame with 5 ms of a radio frame. For example, 64 SSB transmission candidate positions may be specified with respect to a frequency band of 6 GHz or more and subcarrier spacing (SCS, numerology) of 120 kHz.

The transmission candidate position of the SSB may be represented by an SSB index in the time domain.

The radio base station (network, gNB) may transmit any number of SSBs of L SSBs or less every SSB transmission periodicity. Using a bitmap, the radio base station may notify the UE of the actually transmitted SSB.

In synchronization, cell detection, timing detection of a frame and/or a slot and the like, it is essential only that the UE is capable of detecting one SSB. On the other hand, in rate matching, measurement and the like, by recognizing the actually transmitted SSB, the UE is capable of performing rate matching, measurement and the like with high accuracy.

As a method of notifying of the actually transmitted SSB, it is considered to use at least one of the next three pieces of actually transmitted SSB information.

In-Burst SSB Position Information (e.g., Ssb-Positions in Burst) in RMSI

The in-burst SSB position information is included in RMSI. The in-burst SSB position information includes two information elements, in-group bitmap (In One Group, bitmap in group) and group bitmap (group Presence). The in-group bitmap indicates whether or not an SSB in each transmission candidate position in a group is transmitted. The group bitmap indicates whether or not to apply each group inside the SSB transmission period.

The RMSI includes the in-burst SSB position information, and the UE in initial access is thereby capable of interpreting the in-burst SSB position information.

In-Burst SSB Position Information (e.g., Ssb-Positions in Burst) in Serving Cell Configuration Common Information (e.g., Serving Cell ConfigCommon)

The serving cell configuration common information is an information element notified a connected UE by RRC signaling. The in-burst SSB position information is included in the serving cell configuration common information, and indicates an actually transmitted SSB in a serving cell (carrier).

Based on the in-burst SSB position information, the UE is capable of performing rate matching around the actually transmitted SSB in assigned data.

The in-burst SSB position information may include a bit for each transmission candidate position of the actually transmitted SSB. For example, using a bitmap (full bitmap) up to 64 bits, the information may support the presence or absence of the actually transmitted SSB in 64 transmission candidate positions.

Measurement SSB Information (e.g., SSB-to Measure) in SMTC (SS/PBCH Block Based Measurement Timing Configuration) Information (e.g., Smtc1)

The SMTC information is an information element included in a measurement instruction (e.g., measurement object) notified the connected UE by RRC signaling. The measurement SSB information is included in the SMTC information, and indicates which SSB is assumed as a measurement object by a full bitmap. The measurement SSB information indicates actually transmitted SSBs of not only the serving cell, but also of neighboring cells using the same frequency. The actually transmitted SSBs indicated by the measurement SSB information are a super set of actually transmitted SSBs in the serving cell and neighboring cells. The measurement SSB information expresses, as ON, a bit of the SSB transmitted in at least one of the serving cell and neighboring cells. By using the measurement SSB information, the UE is capable of measuring the serving cell and neighboring cells in full. Further, by expressing, as OFF, a bit of an SSB that is not transmitted in any of the serving cell and neighboring cells, it is possible to suppress measurement loads on the UE.

The in-burst SSB position information in the serving cell configuration common information and the measurement SSB information in the SMTC information is notified by RRC signaling, and therefore, as compared with the RMSI, limitations are reduced in the size (overhead). It is possible to use the full bitmap.

On the other hand, the in-burst SSB position information in the RMSI is notified with the RMSI, and therefore, limitations are severe in the size (overhead). With respect to the in-burst SSB position information in the RMSI, in the frequency band of 6 GHz or less, it is possible to use a full bitmap (L=4 or 8). However, in the frequency band of 6 GHz or more, it is not possible to use a full bitmap (L=64), and used are an in-group bitmap and group bitmap. For example, the in-group bitmap is 8 bits, and the group bitmap is 8 bits.

Figure 2:
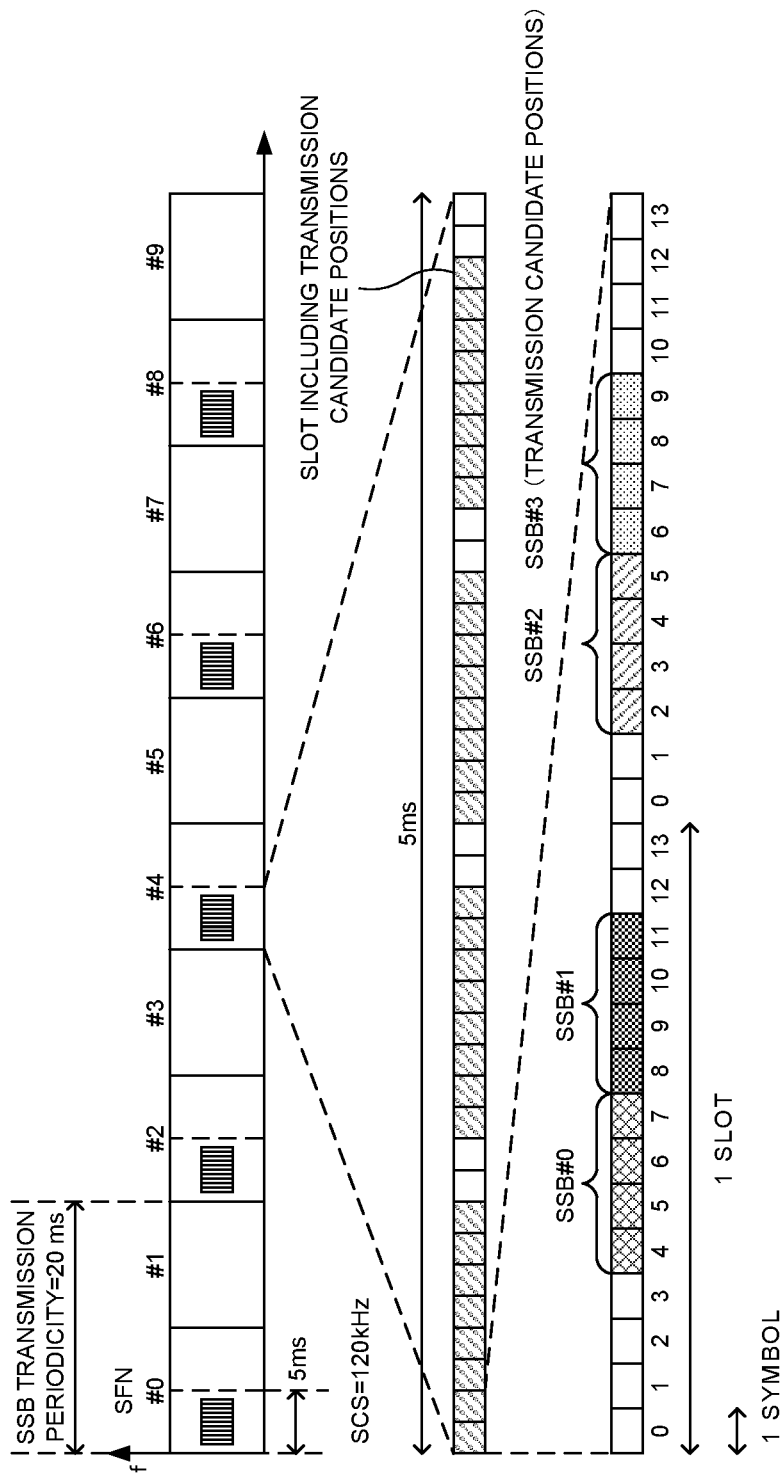
FIG. 2 is a diagram showing one example of transmission candidate positions of SSB.

FIG. 2 is a diagram showing one example of transmission candidate positions of the SSB in the case of using SCS of 120 kHz and SSB transmission periodicity of 20 ms in the frequency band of 6 GHz or more.

Corresponding to the frequency band and SCS, 64 transmission candidate positions within the SSB transmission period (5 ms) may be defined by specifications. In this example, among 10 slots within one radio frame (1 ms), first 8 slots include the transmission candidate position, and last 2 slots do not include the transmission candidate position. The 2 slots are reserved to be used in UL and the like. Each slot of first 8 slots includes 2 transmission candidate positions. A length of one transmission candidate position is 4 symbols.

Figure 3:
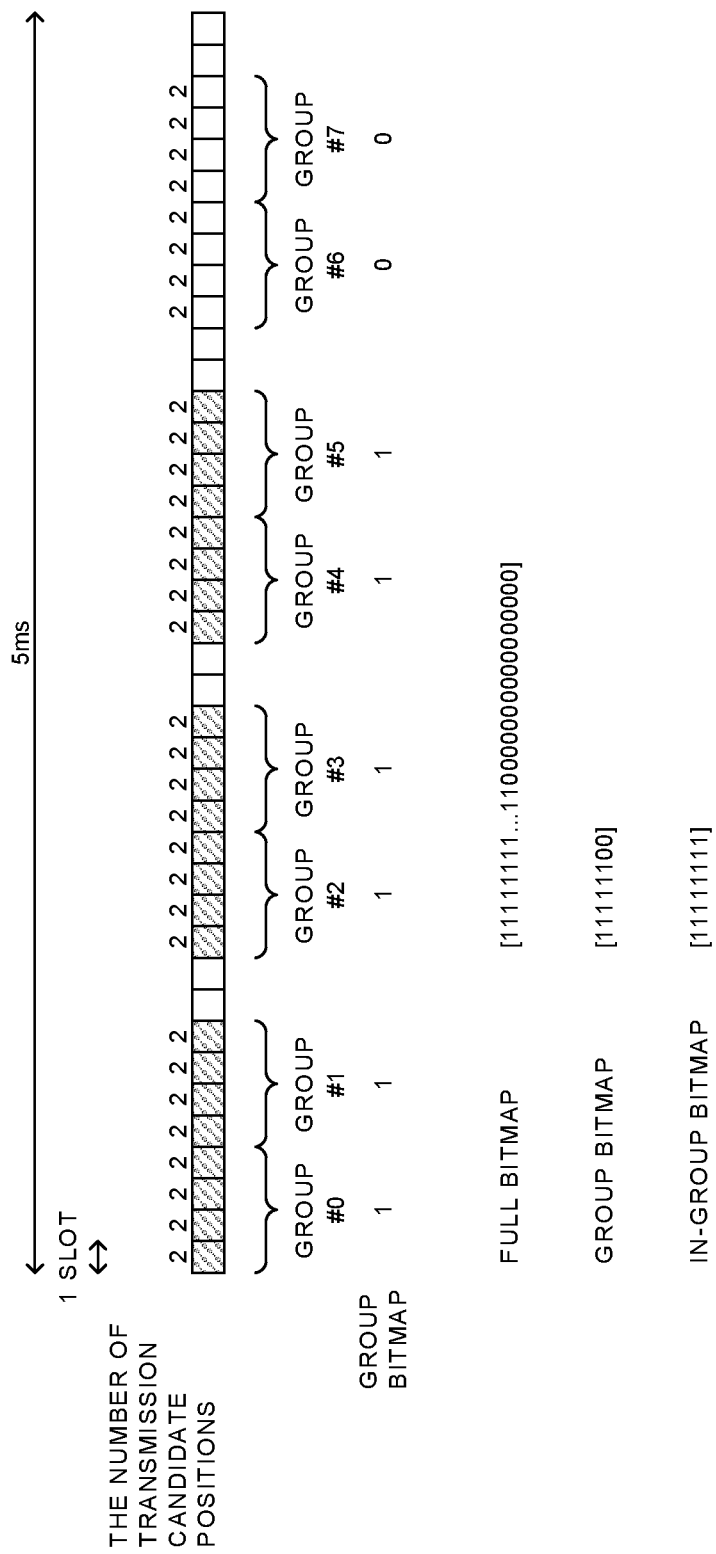
FIG. 3 is a diagram showing one example of a method of notifying of actually transmitted SSB.

As shown in FIG. 3, among 64 transmission candidate positions within the SSB transmission period, a method of notifying of actually transmitted SSBs will be described in the case of transmitting only first 48 SSBs.

In the case of using a full bitmap, the bitmap includes 64 bits that correspond to all transmission candidate positions. In this example, first 48 bits are "1", and remaining 16 bits are "0".

In the case of using a combination of the group bitmap and in-group bitmap, 8 consecutive transmission candidate positions are grouped as one group, and actually transmitted SSBs are indicated in 8 groups.

The group bitmap indicates that a pattern of the in-group bitmap is applied to a group with a bit of "1", and that a group with a bit of "0" does not include the actually transmitted SSB, among groups #0 to #7 that correspond to 8 bits. In other words, the UE determines the presence or absence of the actually transmitted SSB according to the in-group bitmap in the group with a bit of "1", and interprets that the actually transmitted SSB does not exist in the group with a bit of "0". In the group bitmap in this example, bits of groups #0 to #5 are "1", and bits of groups #6 and #7 are "0".

The in-group bitmap indicates that an SSB is transmitted in the transmission candidate position with a bit of "1", and that any SSB is not transmitted in the transmission candidate position with a bit of "0", among transmission candidate positions #0 to #7 that correspond to 8 bits. In the in-group bitmap in this example, bits of all transmission candidate positions are "1".

Further, in NR, the UE may be notified of TDD DL/UL configuration in a TDD carrier semi-statically (by RRC signaling or RMSI), or may be notified dynamically (by DCI). The TDD DL/UL configuration may be notified semi-statically, and be varied dynamically.

Figure 4:
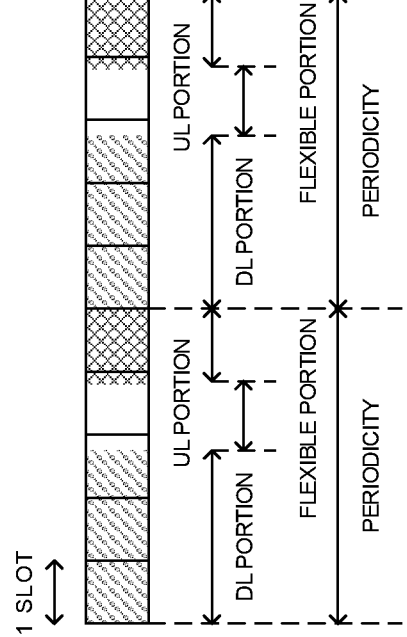
FIG. 4 is a diagram showing one example of TDD DL/UL configuration.

As shown in FIG. 4, in the case of configuring the TDD DL/UL configuration semi-statically, one or two patterns indicating DL (DL portion), flexible or UL (UL portion) may be configured with respect to given periodicity (period) to be specific to the cell. In the case of configuring the TDD DL/UL configuration semi-statically, any pattern indicating DL, flexible or UL for each slot may be configured with respect to given periodicity (period) to be specific to the UE.

The periodicity may be one of 0.5 ms, 0.625 ms, 1 ms, 1.25 ms, 2 ms, 2.5 ms, 5 ms and 10 ms.

Figures 5A, 5B:
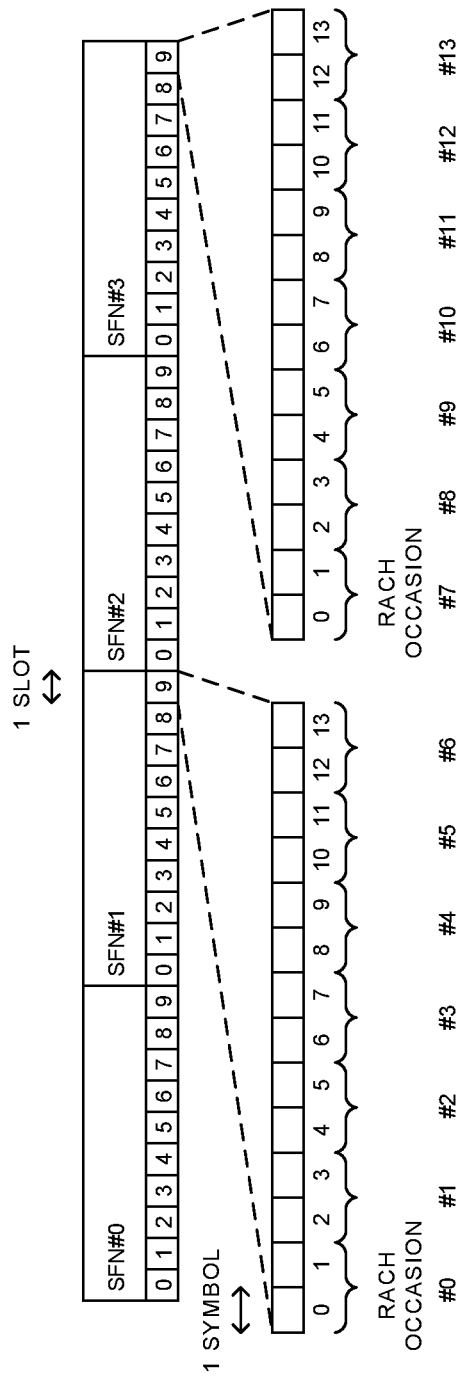
FIGS. 5A and 5B are diagrams showing one example of a method of configuring RACH configuration.

Further, RACH (Random Access Channel or Physical Random Access Channel: PRACH) configuration tables are studied for initial access. As shown in FIG. 5A, the RACH configuration table has a plurality of entries. Each entry indicates the RACH configuration (RACH occasion).

One entry may include an RACH configuration index, preamble (PRACH) format, conditions (x and y) of SFN of RACH occasion, subframe number of RACH occasion, start symbol of RACH occasion, the number of RACH slots in a subframe, and the number of RACH occasions in an RACH slot.

"x and y" indicates the presence of SFN where the RACH occasion is SFN number mod x=y. In the case of SCS of 15 kHz, the number of RACH slots in a subframe is "1". In the case of SCS of 30 kHz, the number is "1" or "2".

This example indicates the RACH configuration table for the frequency band of 6 GHz or less, and also in the frequency band of 6 GHz or more, the similar RACH configuration table may be used.

By designating the RMSI configuration index with the RMSI or the like, the UE may be notified of one RACH configuration in the RACH configuration table. The UE receives the RMSI based on the SSB in some cell, and is thereby capable of recognizing a preamble format and RACH resources (time and frequency positions, periodicity, and relation between SSB and RACH resources) usable in the cell. In the case of transmitting a plurality of SSBs using a plurality of beams, the UE is capable of recognizing the beam for the SSB and/or RACH.

FIG. 5B illustrates RACH occasions in the case where the RACH configuration index xx is notified with the RMSI. Since preamble format C0 indicates a PRACH with a PRACH length of 2 symbols, the length of the RACH occasion is 2 symbols. According to the RACH configuration index xx, since the SFN with SFN number mod 2=1 is SFNs #1 and #3, 7 RACH occasions are configured continuously from symbol #0 of subframe #9 of each of SFNs #1 and #3.

The cell corresponding to standalone (SA, NR) may notify of the next information with the RMSI for initial access UE.

Actually Transmitted SSB (e.g., Combination of Group Bitmap and in-Group Bitmap)

RACH Configuration (e.g., RACH Configuration Index)

The actually transmitted SSB notified with the RMSI designates one pattern of ON/OFF with respect to 8 consecutive SSBs in a group, and configures whether the pattern is applied to each group or all SSBs are OFF. With consideration given to periodical TDD DL/UL configuration, the case is considered where the pattern does not match according to groups.

FIG. 6A illustrates allocation of actually transmitted SSBs for enabling signaling thereof with the RMSI. In this example, the group bitmap is 11111100, and the in-group bitmap is 111100.

The group #0 includes SSBs #0 to #7, and the group #1 includes SSBs #8 to #15. According to the group bitmap and in-group bitmap, SSBs #0 to #5, and #8 to #13 are transmitted (ON), and SSBs #6, #7, #14 and #15 are not transmitted (OFF).

FIG. 6B illustrates allocation of actually transmitted SSBs for disabling signaling thereof with the RMSI. In this example, when it is assumed that TDD DL/UL configuration of DDDDDDDUUU (7:3) is configured with 10 slots as periodicity, the in-group bitmap corresponding to groups #0, #2, #4 and #6 is 11111111, and the in-group bitmap corresponding to groups #1, #3, #5 and #7 is 11111100. Accordingly, since the in-group bitmap does not match among groups, it is not possible to correctly notify of such actually transmitted SSBs with the RMSI (group bitmap and in-group bitmap).

Particularly, in the frequency band of 6 GHz or more, since the RMSI is not capable of using the full bitmap for notification of actually transmitted SSBs, there is the case where it is not possible to correctly notify of the actually transmitted SSB.

Hereinafter, such a method is called the existing notification method that the actually transmitted SSB information includes a group bitmap of 8 bits and in-group bitmap of 8 bits, and that a UE interprets that all SSBs in a group are OFF with respect to the group (corresponding bits in the group bitmap are "0") to which a pattern of the in-group bitmap is not applied.

The UE associates the actually transmitted SSB notified by the actually transmitted SSB information with the RACH occasion designated by the RACH configuration index. When there are no RACH resources subjected to FDM, the UE associates the RACH occasion in time order with the actually transmitted SSB in SSB index order. In the case where the number of RACH occasions is higher than the number of actually transmitted SSBs, the RACH occasion that is not associated with the actually transmitted SSB may be used in another use.

For example, in the case where the UE is notified of the RACH occasion of FIG. 5B and the actually transmitted SSB of FIG. 6A, the UE associates RACH occasions #0 to #6 with SSBs #0 to #5 and #8, respectively.

Further, for example, in the case where RACH occasions #0 to #6 are configured with the RACH configuration index, and SSBs #1 to #7 are configured with the actually transmitted SSB information, the UE associates the RACH occasions #0 to #6 with the SSBs #1 to #7, respectively.

Using the RACH occasion that corresponds to the detected SSB, the UE is capable of performing initial access (random access procedure, PRACH transmission).

As described previously, the actually transmitted SSB information notified with the RMSI limits allocation of notification-capable SSBs. In the case of permitting an error of the actually transmitted SSB information, there is a possibility that the actually transmitted SSB information does not match with allocation of actually transmitted SSBs. Due to that the actually transmitted SSBs notified with the RMSI does not match with the status, the following problems 1 and 2 occur.

Problem 1: The Case where the Actually Transmitted SSB is not Included in the Actually Transmitted SSB Information (the Case where the Number of Notified Actually Transmitted SSBs is Lower than the Number of Actually Transmitted SSBs)

Since there is no RACH occasion that corresponds to the SSB, even when the UE detects the SSB (or beam that corresponds to the SSB), the UE does not transmit the PRACH, and is not able to connect.

Problem 2: The Case where an SSB that is not Actually Transmitted is Included in the Actually Transmitted SSB Information (the Case where the Number of Notified Actually Transmitted SSBs is Higher than the Number of Actually Transmitted SSBs)

In the case where a connected (RRC connected) UE and another UE that performs initial access coexist in one cell, the connected UE is notified of the actually transmitted SSB using the full bitmap (RRC signaling), and the UE that performs initial access is notified of the actually transmitted SSB using the combination (RMSI) of the group bitmap and in-group bitmap.

In the case where the full bitmap indicates the correct actually transmitted SSB, and the combination of the group bitmap and in-group bitmap includes the SSB that is not actually transmitted, a mismatch occurs in the relationship between the RACH occasion and the SSB, between the connected UE and the initial-access UE. The connected UE and initial-access UE use different RACH occasions with respect to one SSB.

In the case where the full bitmap also includes the SSB that is not actually transmitted SSB in accordance with the combination of the group bitmap and in-group bitmap, the connected UE performs rate matching in the SSB that is not actually transmitted, or the like, and loss occurs in throughput.

In the case where an error of the actually transmitted SSB information is not permitted, allocation of the actually transmitted SSB is limited, and the number of usable SSBs is decreased.

Thus, in the case of notifying of the actually transmitted SSB using the RMSI in the frequency band of 6 GHz or more, there is the risk that performance of the system deteriorates. Therefore, the inventors of the present invention studied methods of expressing the actually transmitted SSB using the combination of the group bitmap and in-group bitmap, and arrived at the invention.

Embodiments according to the present invention will be described below in detail with reference to drawings. A radio communication method according to each of the Embodiments may be applied alone, or may be applied in combination.

(Aspect 1)

Aspect 1 describes an interpretation of the group bitmap.

The combination of the group bitmap and in-group bitmap is used in only the frequency band (FR2, millimeter wave) of 6 GHz or more, and in this frequency band, it is necessary to transmit many SSBs (beams). Therefore, when it is configured that each bit in the group bitmap represents whether a pattern indicated in the in-group bitmap is applied to a corresponding group, or all SSBs in the group are transmitted, it is possible to express allocation matched with the situation.

About the interpretation of bits of "0" in the group bitmap notified with the RMSI, the UE interprets that all SSBs within a group are actually transmitted SSBs (ON) with respect to the group where a pattern of the in-group bitmap is not applied (corresponding bits in the group bitmap are "0").

Figure 7:
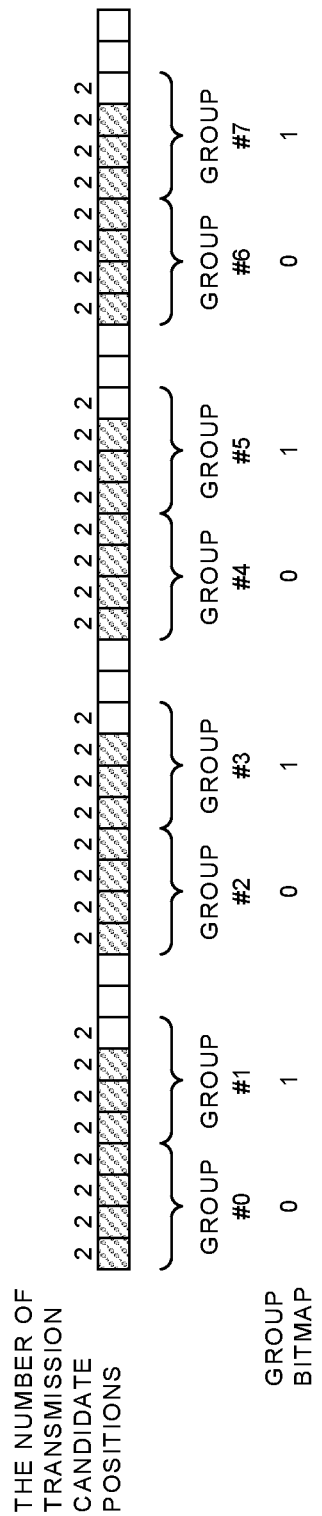
FIG. 7 is a diagram showing one example of actually transmitted SSBs according to Aspect 1.
Figure 8:
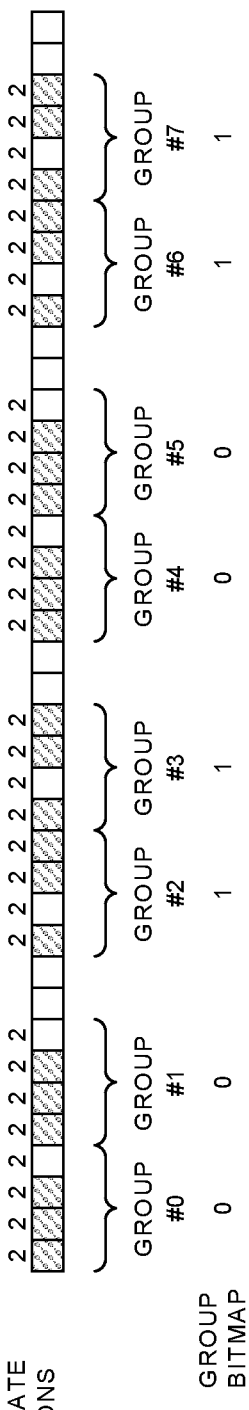
FIG. 8 is a diagram showing one example of actually transmitted SSBs according to Aspect 4.

Allocation of the actually transmitted SSBs in FIG. 7 is capable of being expressed using 01010101 as the group bitmap, and 11111100 as the in-group bit map. On the other hand, when a bit of some group in the group bitmap is "0", in the case of interpreting that all SSBs within the group are OFF, it is not possible to correctly notify of allocation of the actually transmitted SSB of FIG. 7.

Since the actually transmitted SSB information includes the group bitmap of 8 bits and the in-group bitmap of 8 bits, the size of the actually transmitted SSB information is 16 bits.

According to Aspect 1, as compared with the existing notification method, it is possible to increase the number of usable SSBs, and it is possible to express allocation adapted to the situation in the case of using many SSBs in the high frequency band. Further, as compared with the existing notification method, it is possible to prevent the size of the actually transmitted SSB information from increasing.

(Aspect 2)

Aspect 2 describes a method of switching between interpretations of bits in the group bitmap based on instruction information (default SSB presence In Group).

The instruction information of 1 bit may be included in the RMSI. With respect to a group (corresponding bits in the group bitmap are "0") to which a pattern of the in-group bitmap is not applied, the instruction information indicates whether to interpret that all SSBs within the group are ON, or to interpret that all SSBs within the group are ON. The instruction information may indicate "1" in the case of interpreting that all SSBs within the group are ON, and may indicate "0" in the case of interpreting that all SSBs within the group are ON, or may indicate conversely.

Since the actually transmitted SSB information includes the group bitmap of 8 bits, the in-group bitmap of 8 bits and the instruction information of 1 bit, the size of the actually transmitted SSB information is 17 bits.

According to Aspect 2, as compared with the existing notification method, it is possible to increase allocation of the actually transmitted SSB, and it is possible to express allocation adapted to the situation. Further, as compared with the existing notification method, it is possible to reduce increases in the size of the actually transmitted SSB information to a minimum.

(Aspect 3)

Aspect 3 describes a method of switching between interpretations of the actually transmitted SSB information based on the TDD DL/UL configuration.

The RMSI may notify of the TDD DL/UL configuration semi-statically. Even in the case where a slot indicated as UL by the TDD DL/UL configuration includes an SSB indicated by the actually transmitted SSB information, the UE may interpret (assume) that all SSBs within the slot are OFF.

Aspect 3 may be combined with one of Aspects 1, 2, 4 and 5.

According to Aspect 3, by combining the actually transmitted SSB information and TDD DL/UL configuration, as compared with the existing notification method, it is possible to increase allocation of the actually transmitted SSB, and it is possible to express allocation adapted to the situation.

(Aspect 4)

Aspect 4 describes a method of notifying of a plurality of in-group bitmaps.

The actually transmitted SSB information includes one group bitmap and two in-group bitmaps #0 and #1. With respect to a corresponding group, bits in the group bitmap indicate whether to apply the in-group bitmap #0 or apply the in-group bitmap #1. The bit in the group bitmap may represent the in-group bitmap #0 by "0", and represent the in-group bitmap #1 by "1". In other words, the bit in the group bitmap may represent an index of the in-group bitmap.

Since the actually transmitted SSB information includes the group bitmap of 8 bits, the in-group bitmap #0 of 8 bits, and the in-group bitmap #1 of 8 bits, the size of the actually transmitted SSB information is 24 bits.

Allocation of the actually transmitted SSBs in FIG. is expressed by the group bitmap of 00110011, the in-group bitmap #0 of 11111100, and the in-group bitmap #1 of 11001111.

In addition, the actually transmitted SSB information may include three or more in-group bitmaps. In this case, the size of the group bitmap may be increased to indicate one of three or more applied in-group bitmaps respectively applied to a plurality of groups.

According to Aspect 4, by notifying of a plurality of in-group bitmaps, as compared with the existing notification method, it is possible to increase allocation of the actually transmitted SSB, and it is possible to express allocation adapted to the situation.

(Aspect 5)

Aspect 5 describes a method of notifying of information more than 1 bit with respect to each group, using the group bitmap.

With respect to each group, the group bitmap may indicate one of three values such that a pattern of the in-group bitmap is applied, all SSBs within the group are OFF, and that all SSBs within the group are ON.

The following options 1 and 2 may be used.

Option 1

Figure 9:
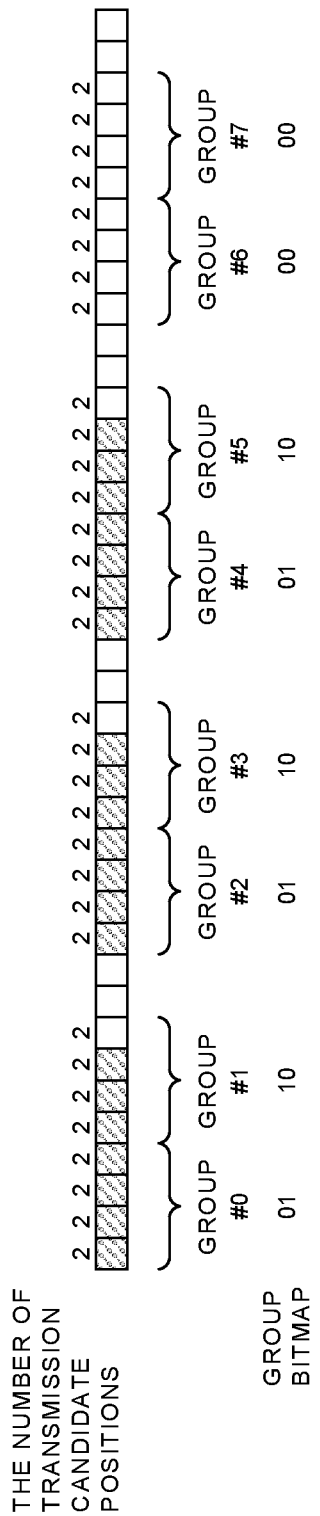
FIG. 9 is a diagram showing one example of actually transmitted SSBs according to Aspect 5.

With respect to each group, the group bitmap indicates three values using 2 bits. For example, as shown in FIG. 9, bits that correspond to each group may represent that all SSBs within the group are OFF by "00", all SSBs within the group are ON by "01", and that a pattern of the in-group bitmap is assigned by "10".

Since the actually transmitted SSB information in this case includes the group bitmap of 16 bits and the in-group bitmap of 8 bits, the size of the actually transmitted SSB information is 24 bits.

Option 2

The group bitmap may indicate three values ($3^8$=6561 code points) of 8 groups using 13 bits.

Since the actually transmitted SSB information in this case includes the group bitmap of 13 bits and the in-group bitmap of 8 bits, the size of the actually transmitted SSB information is 21 bits. Accordingly, as compared with Option 1, Option 2 is capable of suppressing the size of the actually transmitted SSB information.

According to Aspect 5, by notifying of a plurality of in-group bitmaps, as compared with the existing notification method, it is possible to increase allocation of the actually transmitted SSB, and it is possible to express allocation adapted to the situation.

According to each of the above-mentioned Aspects and combination thereof, in a cell which supports standalone (SA) and uses the frequency band of 6 GHz or more, flexibility is improved in the number of actually transmitted SSBs, and the number of allocations of the actually transmitted SSB. Further, in the cell which supports SA and uses the frequency band of 6 GHz or more, it is possible to al locate RACH occasions flexibly without waste. Furthermore, there is a possibility that non-standalone (NSA) shifts to standalone in future. With the shift, when configurations of beam patterns and the like are changed, the configurations need to be configured again after the shift. It is preferable that the number of SSBs, beam pattern and the like are not changed between NSA and SA. Accordingly, with respect to not only the cell supporting SA, but also the cell of NSA, as in the cell of SA, it is preferable to notify the UE of the actually transmitted SSB information.

(Radio Communication System)

A configuration of a radio communication system according to one Embodiment of the present invention will be described below. In the radio communication system, communication is performed by using any of the radio communication methods according to above-mentioned each Embodiment of the invention or combination thereof.

Figure 10:
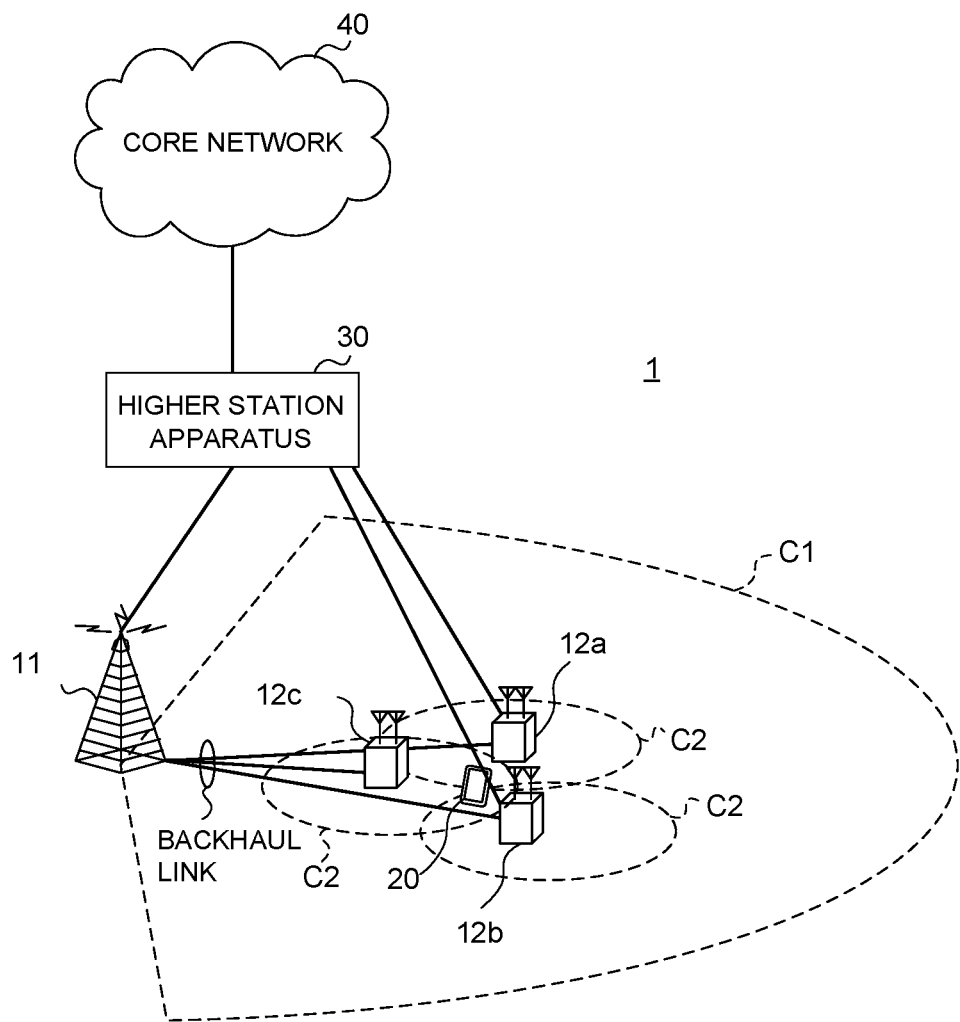
FIG. 10 is a diagram showing one example of a schematic configuration of a radio communication system according to one Embodiment of the present invention.

FIG. 10 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology) and the like, or may be called the system to actualize each system described above.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2. The arrangement, numbers and the like of each cell and user terminal 20 are not limited to those shown in the figure.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (also called the existing carrier, legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, etc.), or may use the same carrier as in the radio base station 11. In addition, the configuration of the frequency band used in each radio base station is not limited thereto.

The radio base station 11 and radio base station 12 (or, two radio base stations 12) may be configured to undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) and/or OFDMA is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel) and the like. The downlink control information (DCI) including scheduling information of the PDSCH and/or PUSCH and the like is transmitted on the PDCCH.

In addition, scheduling information may be notified by DCI. For example, DCI for scheduling DL data reception may be called a DL assignment, and DCI for scheduling UL data transmission may be called a UL grant.

The number of OFDM symbols used in the PDCCH is transmitted on the PCFICH. Receipt confirmation information (e.g., also referred to as retransmission control information, HARQ-ACK, ACK/NACK, etc.) of HARQ (Hybrid Automatic Repeat reQuest) for the PUSCH is transmitted on the PHICH. The EPDCCH is frequency division multiplexed with the PDSCH (downlink shared data channel) to be used in transmission of the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data, higher layer control information and the like is transmitted on the PUSCH. Further, radio quality information (CQI: Channel Quality Indicator) of downlink, receipt confirmation information, scheduling request (SR) and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), Demodulation Reference Signal (DMRS: DeModulation Reference Signal), Positioning Reference Signal (PRS) and the like. Further, as uplink reference signals, in the radio communication system 1 are transmitted Sounding Reference Signal (SRS), Demodulation Reference Signal (DMRS) and the like. In addition, the DMRS may be called UE-specific Reference Signal. Further, the transmitted reference signals are not limited thereto.

<Radio Base Station>

Figure 11:
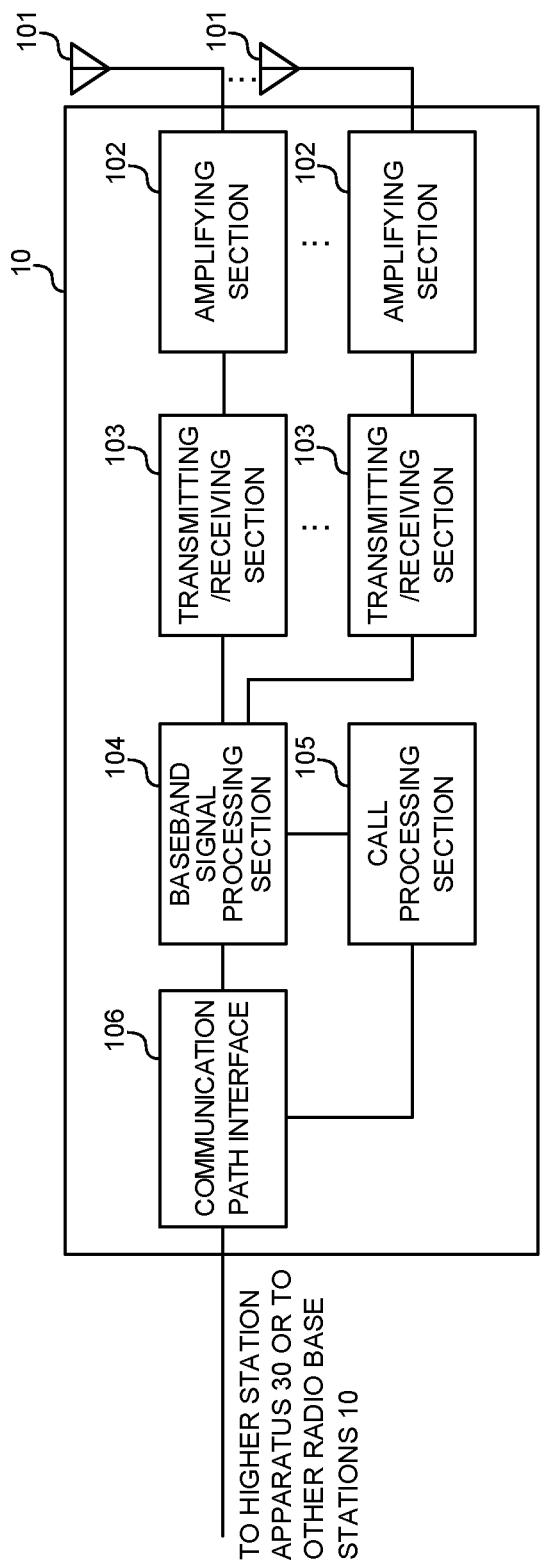
FIG. 11 is a diagram showing one example of an entire configuration of a radio base station according to one Embodiment of the invention.

FIG. 11 is a diagram showing one example of an entire configuration of the radio base station according to one Embodiment of the present invention. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing (configuration, release and the like) of a communication channel, state management of the radio base station 10, management of radio resources and the like.

The communication path interface 106 transmits and receives signals to/from the higher station apparatus 30 via a given interface. Further, the communication path interface 106 may transmit and receive signals (backhaul signaling)

to/from another radio base station 10 via an inter-base station interface (e.g., optical fiber in conformity with CPRI (Common Public Radio Interface), X2 interface).

Further, the transmitting/receiving section 103 may transmit group information and pattern information. Furthermore, the transmitting/receiving section 103 may transmit a synchronization signal block (e.g., SSB, SS/PBCH block) in resources indicated by the group information and pattern information.

Figure 12:
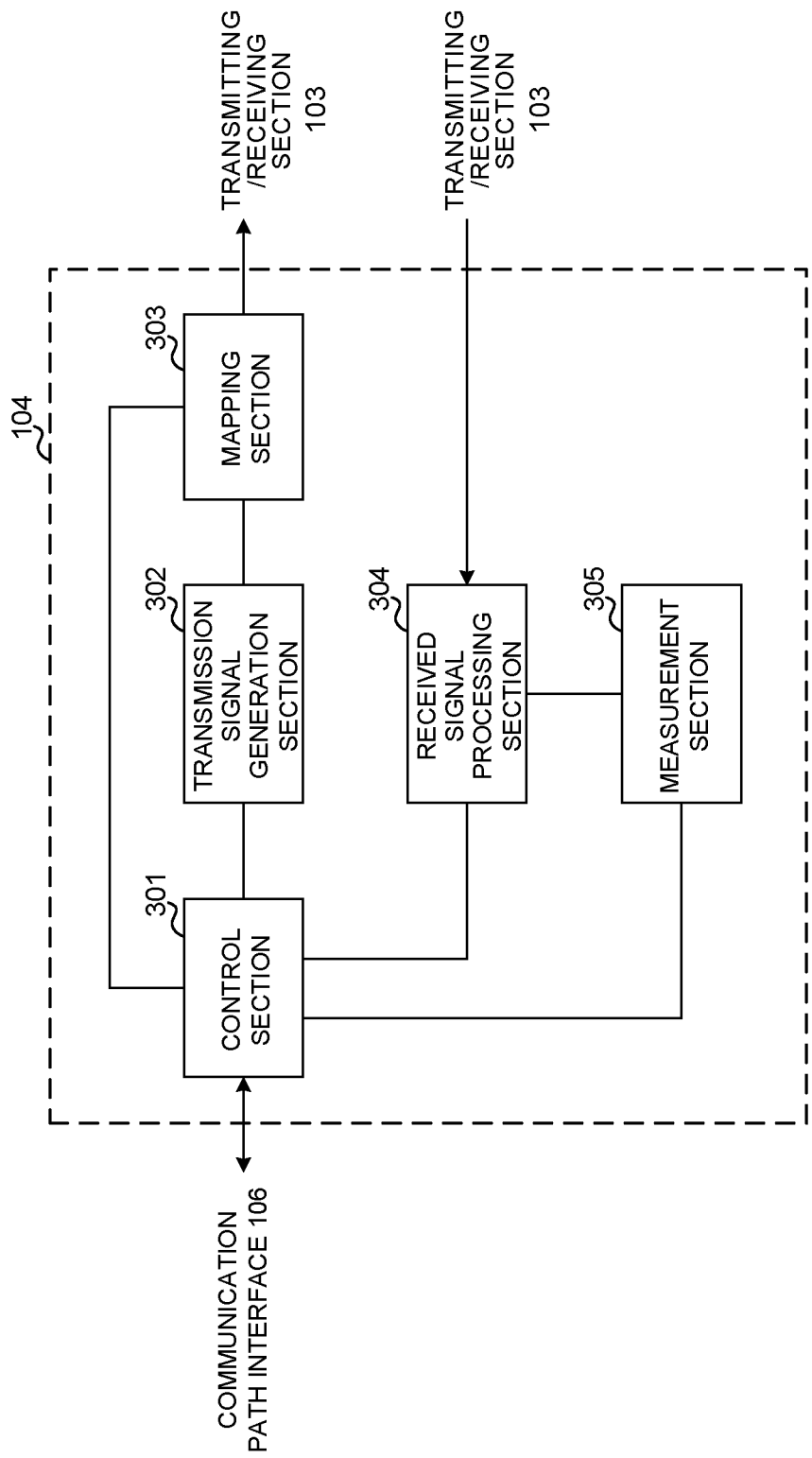
FIG. 12 is a diagram showing one example of a function configuration of the radio base station according to one Embodiment of the invention.

FIG. 12 is a diagram showing one example of a function configuration of the radio base station according to one Embodiment of the present invention. In addition, this example mainly illustrates function blocks of a characteristic portion in this Embodiment, and the radio base station 10 is assumed to also have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, allocation of signals by the mapping section 303 and the like. Further, the control section 301 controls reception processing of signals by the received signal processing section 304, measurement of signals by the measurement section 305 and the like.

The control section 301 controls scheduling (e.g., resource allocation) of system information, downlink data signal (e.g., signal transmitted on the PDSCH), and downlink control signal (e.g., signal transmitted on the PDCCH and/or EPDCCH, receipt conformation information, etc.). Further, based on a result obtained by determining the necessity of retransmission control to an uplink data signal, and the like, the control section 301 controls generation of the downlink control signal, downlink data signal and the like. Furthermore, the control section 301 controls scheduling of synchronization signals (e.g., PSS (Primary Synchronization Signal)/SSS (Secondary Synchronization Signal)), downlink reference signals (e.g., CRS, CSI-RS, DMRS) and the like.

The control section 301 controls scheduling of the uplink data signal (e.g., signal transmitted on the PUSCH), uplink control signal (e.g., signal transmitted on the PUCCH and/or PUSCH, receipt confirmation information, etc.), random access preamble (e.g., signal transmitted on the PRACH), uplink reference signal and the like.

Based on instructions from the control section 301, the transmission signal generating section 302 generates downlink signals (downlink control signal, downlink data signal, downlink reference signal, etc.) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates a DL assignment to notify of assignment information of downlink data and/or UL grant to notify of assignment information of uplink data. Each of the DL assignment and UL grant is the DCI and conforms to a DCI format. Further, the downlink data signal is subjected to oding processing and modulation processing, according to a coding rate, modulation scheme and the like determined based on the channel state information (CSI) from each user terminal 20 and the like.

Based on instructions from the control section 301, the mapping section 303 maps the downlink signal generated in the transmission signal generating section 302 to given radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the uplink signal (uplink control signal, uplink data signal, uplink reference signal, etc.) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs the HARQ-ACK to the control section 301. Further, the received signal processing section 304 outputs the received signal and/or signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, based on the received signal, the measurement section 305 may perform RRM (Radio Resource Management) measurement, CSI (Channel State Information) measurement and the like. The measurement section 305 may measure received power (e.g., RSRP (Reference Signal Received Power)), received quality (e.g., RSRQ (Reference Signal Received Quality), SINR (Signal to Interference plus Noise Ratio), signal strength (e.g., RSSI (Received Signal Strength Indicator)), propagation path information (e.g., CSI) and the like. The measurement result may be output to the control section 301.

<User Terminal>

Figure 13:
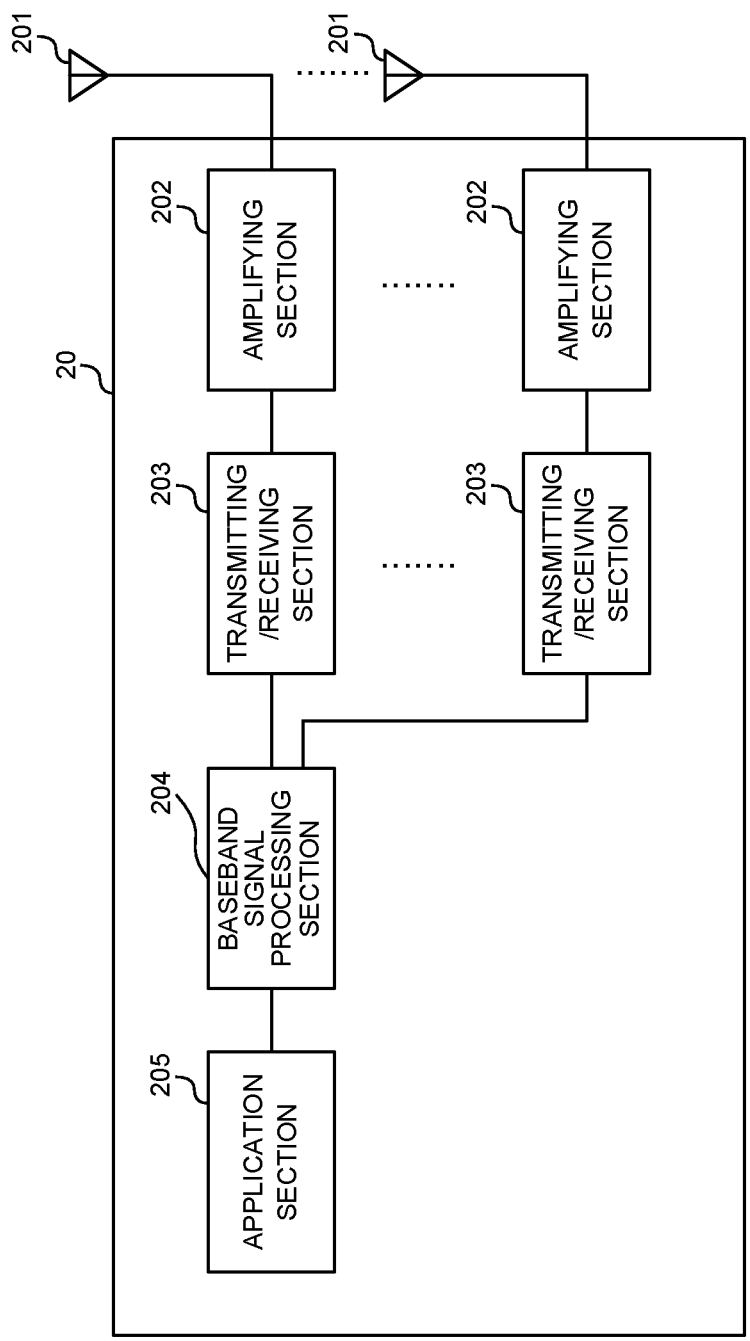
FIG. 13 is a diagram showing one example of an entire configuration of a user terminal according to one Embodiment of the invention.

FIG. 13 is a diagram showing one example of an entire configuration of the user terminal according to one Embodiment of the present invention. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information may also be transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

Further, the transmitting/receiving section 203 may receive the pattern information (e.g., in-group bitmap, In One Group, bitmap in group, in-group bitmap #0) indicating whether or not a synchronization signal block (e.g., SS block, SS/PBCH block) is transmitted in each of a plurality of transmission candidate positions within a group of the transmission candidate positions of the synchronization signal block, and group information (e.g., group bitmap, group Presence) indicating the method of applying the pattern information to each of a plurality of groups.

Furthermore, the transmitting/receiving section 203 may receive instruction information (e.g., default SSB presence In Group) on interpretations of the group information.

Still furthermore, the transmitting/receiving section 203 may further receive additional pattern information (e.g., in-group bitmap #1) indicating whether or not a synchronization signal block is transmitted in each of a plurality of transmission candidate positions.

Moreover, the transmitting/receiving section 203 may receive configuration information (e.g., RRC signaling indicating TDD DL/UL configuration, RMSI, DCI, etc.) for configuring one of downlink, uplink and flexible for a particular period (e.g., slot).

Figure 14:
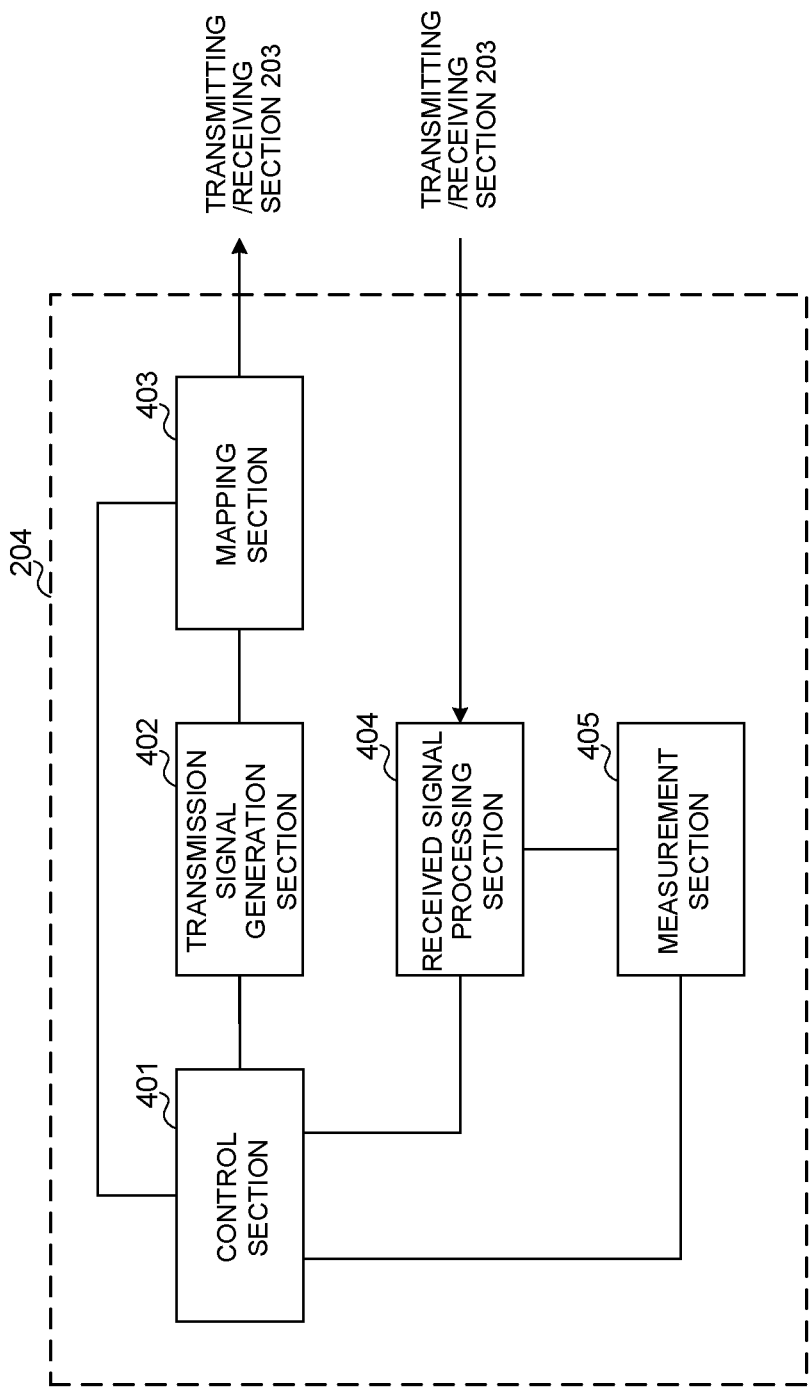
FIG. 14 is a diagram showing one example of a function configuration of the user terminal according to one Embodiment of the invention.

FIG. 14 is a diagram showing one example of a function configuration of the user terminal according to one Embodiment of the present invention. In addition, this example mainly illustrates function blocks of a characteristic portion in this Embodiment, and the user terminal 20 is assumed to also have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, allocation of signals by the mapping section 403 and the like. Further, the control section 401 controls reception processing of signals by the received signal processing section 404, measurement of signals by the measurement section 405 and the like.

The control section 401 acquires the downlink control signal and downlink data signal transmitted from the radio base station 10, from the received signal processing section 404. Based on the downlink control signal and/or a result obtained by determining the necessity of retransmission control to the downlink data signal, and the like, the control section 401 controls generation of the uplink control signal and/or uplink data signal.

In the case of acquiring various kinds of information notified from the radio base station 10, from the received signal processing section 404, the control section 401 may update a parameter used in control based on the information.

Based on instructions from the control section 401, the transmission signal generating section 402 generates uplink signals (uplink control signal, uplink data signal, uplink reference signal, etc.) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal about receipt confirmation information, channel state information (CSI) and the like. Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding, etc.) on the received signal input from the transmitting/receiving section 203. Herein, for example, the received signal is the downlink signal (downlink control signal, downlink data signal, downlink reference signal, etc.) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal processing section 404 outputs the broadcast information, system information, RRC signaling, DCI and the like to the control section 401. Further, the received signal processing section 404 outputs the received signal and/or signal subjected to the reception processing to the measurement section 405.

The measurement section 405 performs measurement on the received signal. The measurement section 405 is capable of being comprised of a measurement device, measurement circuit or measurement apparatus explained based on the common recognition in the technical field according to the present invention.

For example, based on the received signal, the measurement section 405 may perform RRM measurement, CSI measurement and the like. The measurement section 405 may measure received power (e.g., RSRP), received quality (e.g., RSRQ, SINR), signal strength (e.g., RSSI), propagation path information (e.g., CSI) and the like. The measurement result may be output to the control section 401.

Further, based on the group information, the control section 401 may control one of assuming that the synchronization signal block is transmitted in all transmission candidate positions within a particular group (e.g., group that corresponds to a particular value in the group bitmap), and of determining a plurality of transmission candidate positions within the particular group according to the pattern information.

Furthermore, in the case where an element that corresponds to a particular group in the group information is a particular value, the control section 401 may assume that the synchronization signal block is transmitted in all transmission candidate positions within the particular group (Aspects 1 and 5).

Still furthermore, in the case where an element that corresponds to a particular group in the group information is a particular value, based on the instruction information, the control section 401 may judge assuming that the synchronization signal block is transmitted in all transmission candidate positions within the particular group or assuming that the synchronization signal block is not transmitted in all transmission candidate positions within the particular group (Aspect 2).

Moreover, the control section 401 may determine a plurality of transmission candidate positions within a particular group, according to one of an element (e.g., bit) that corresponds to the particular group in the group information, the pattern information (e.g., in-group bitmap #0) and the additional pattern information (e.g., in-group bitmap #1) (Aspect 4).

Further, in the case where the configuration information indicates uplink, irrespective of the group information and pattern information, the control section 401 may assume that the synchronization signal block is not transmitted in a particular period (e.g., slot) (Aspect 3).

Furthermore, in the case where an element that corresponds to a particular group in the group information is a particular value, the control section 401 may perform one of assuming that the synchronization signal block is transmitted in all transmission candidate positions within the particular group, assuming that the synchronization signal block is not transmitted in all transmission candidate positions within the particular group, and determining a plurality of transmission candidate positions within the particular group according to the pattern information (Aspect 5).

<Hardware Configuration>

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized using a single apparatus combined physically and/or logically, or two or more apparatuses that are separated physically and/or logically are connected directly and/or indirectly (e.g., using cable and/or radio), and each function block may be actualized using a plurality of these apparatuses.

Figure 15:
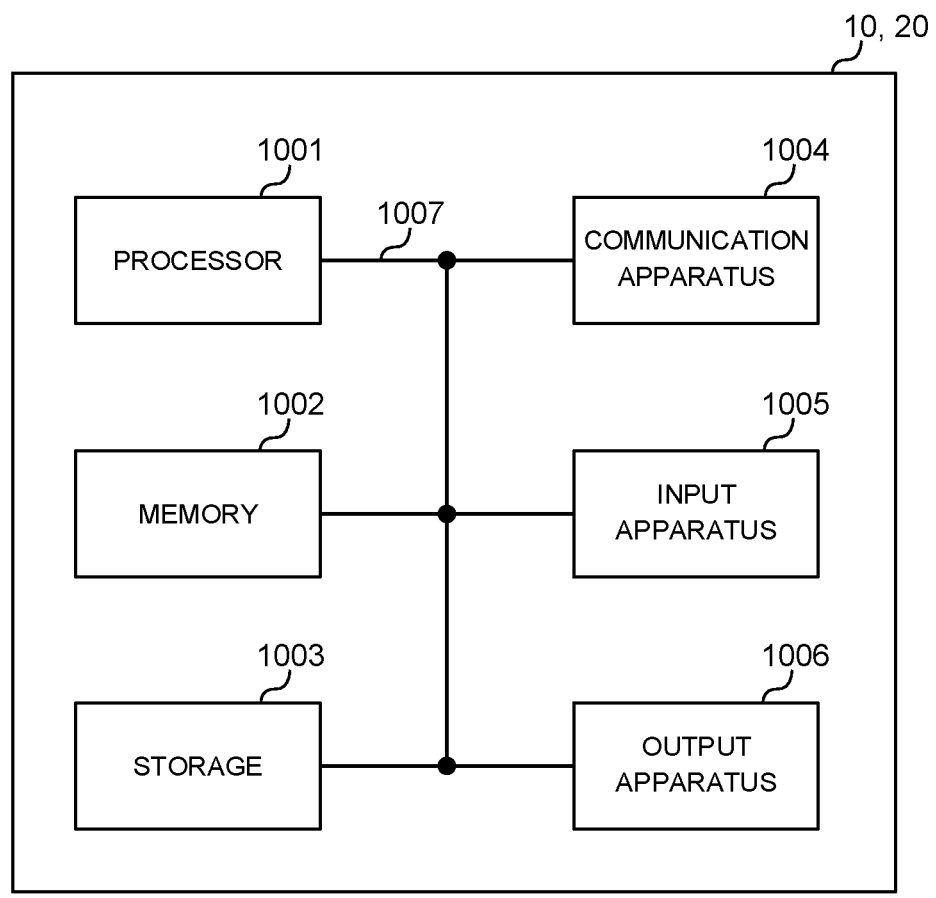
FIG. 15 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 15 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or using another technique. In addition, the processor 1001 may be implemented on one or more chips.

For example, each function in the radio base station 10 and user terminal 20 is actualized in a manner such that given software (program) is read on the hardware of the processor 1001, memory 1002 and the like, and that the processor 1001 thereby performs computations, and controls communication via the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least apart of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized using the hardware. For example, the processor 1001 may be implemented using at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, the component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel. 8-12), normal TTI, long TTI, ordinary subframe, normal subframe, long subframe or the like. The TTI shorter than the ordinary TTI may be called shortened TTI, short TTI, partial or fractional TTI, shortened subframe, short subframe, mini-slot, subslot or the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subcarrier, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), resource element group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of sub carriers included in the RB, the number of symbols within the TTI, the symbol length, the cyclic prefix (CP) length and the like.

Further, the information, parameter and the like explained in the present Description may be expressed using an absolute value, may be expressed using a relative value from a given value, or may be expressed using another corresponding information. For example, the radio resource may be indicated by a given index.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed using another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of given information (e.g., notification of "being X") is not limited to explicit notification, and may be performed implicitly (e.g., notification of the given information is not performed, or by notification of different information).

The decision may be made with a value ("0" or "1") expressed by 1 bit, may be made with a Boolean value represented by true or false, or may be made by comparison with a numerical value (e.g., comparison with a given value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being segmented into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station subsystem that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, operation performed by the base station may be performed by an upper node thereof in some case. In a network including one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term. Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description do not limit the amount or order of these elements overall. These designations are capable of being used in the present Description as the useful method to distinguish between two or more elements. Accordingly, references of first and second elements do not mean that only two elements are capable of being adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., looking up in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present Description, in the case where two elements are connected, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description, the terms of "A and B are different" may mean that "A and B are different from each other". The terms of "separate", "coupled" and the like may be similarly interpreted.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not provide the invention with any restrictive meaning.

The invention claimed is:

1. A terminal comprising:
 a receiving section that receives pattern information indicating whether or not a synchronization signal block is transmitted in each of a plurality of transmission candidate positions within a group of transmission candidate positions of the synchronization signal block, and group information indicating a method of applying the pattern information to each of a plurality of groups; and
 a control section that controls, based on the group information, one of assuming that the synchronization signal block is transmitted in all transmission candidate positions within a particular group, and of determining the plurality of transmission candidate positions within the particular group according to the pattern information.

2. The terminal according to claim 1, wherein when an element that corresponds to the particular group in the group information is a particular value, the control section assumes that the synchronization signal block is transmitted in all transmission candidate positions within the particular group.

3. The terminal according to claim 1, wherein the receiving section receives instruction information on an interpretation of the group information, and when an element that corresponds to the particular group in the group information is a particular value, based on the instruction information, the control section judges assuming that the synchronization signal block is transmitted in all transmission candidate positions within the particular group or assuming that the synchronization signal block is not transmitted in all transmission candidate positions within the particular group.

4. The terminal according to claim 1, wherein the receiving section further receives additional pattern information indicating whether or not the synchronization signal block is transmitted in each of the plurality of transmission candidate positions, and the control section determines the plurality of transmission candidate positions within the particular group, according to one of an element that corresponds to the particular group in the group information, the pattern information and the additional pattern information.

5. The terminal according to claim 1, wherein the receiving section receives configuration information for configuring one of downlink, uplink and flexible for a particular period, and when the configuration information indicates uplink, irrespective of the group information and the pattern information, the control section assumes that the synchronization signal block is not transmitted in the particular period.

6. A radio communication method of a terminal, including:
   receiving pattern information indicating whether or not a synchronization signal block is transmitted in each of a plurality of transmission candidate positions within a group of transmission candidate positions of the synchronization signal block, and group information indicating a method of applying the pattern information to each of a plurality of groups; and
   controlling, based on the group information, one of assuming that the synchronization signal block is transmitted in all transmission candidate positions within a particular group, and of determining the plurality of transmission candidate positions within the particular group according to the pattern information.

\* \* \* \* \*